April 3, 1956
D. L. McKAY
2,740,697
PHASE CONTACTOR
Filed Dec. 24, 1953
2 Sheets-Sheet 1
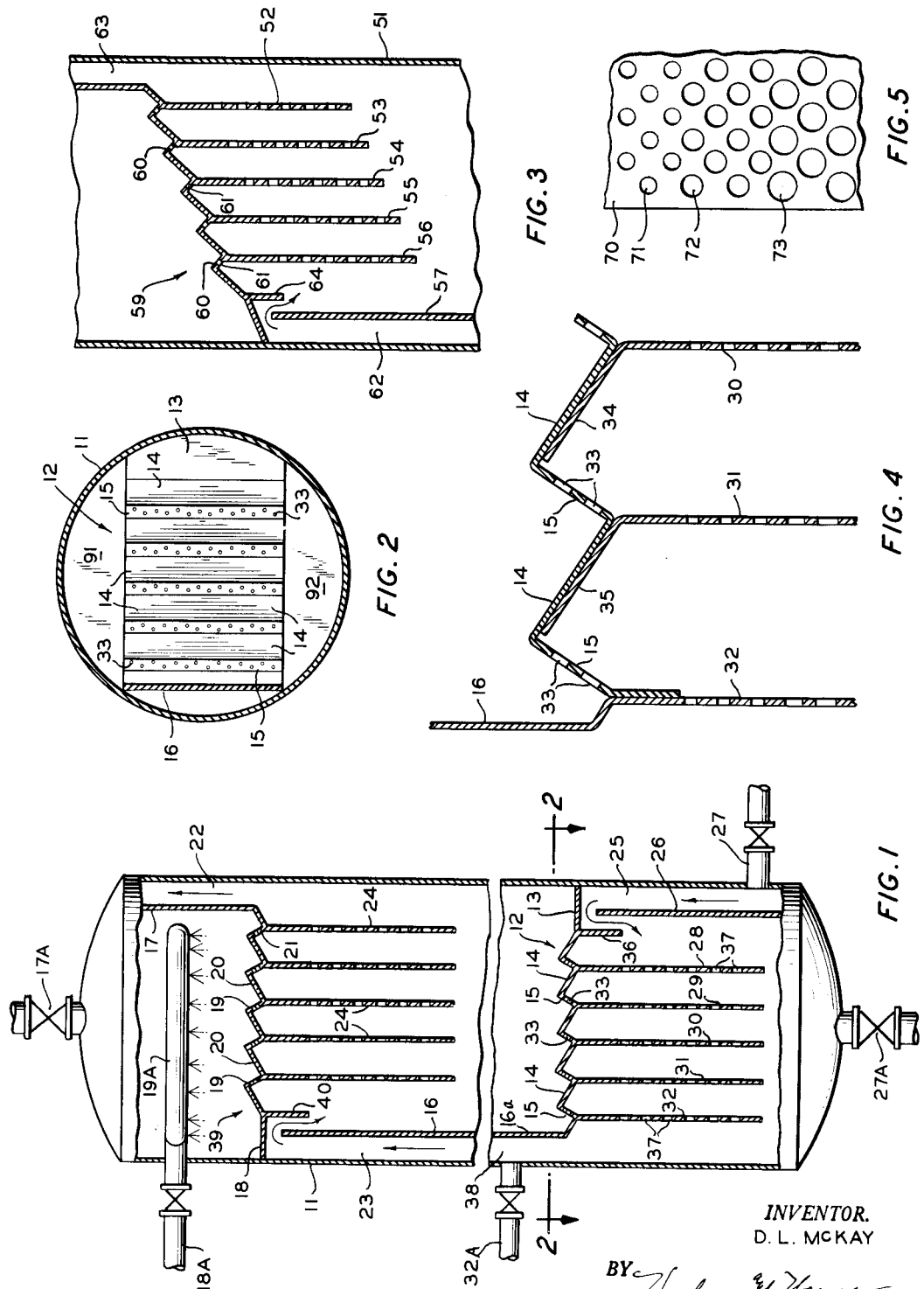
INVENTOR.
D. L. McKAY
BY Hudson & Young
ATTORNEYS INVENTOR.
D. L. McKAY
BY Hudson & Young
ATTORNEYS United States Patent Office 2,740,697
Patented Apr. 3, 1956

2,740,697

PHASE CONTACTOR

Dwight L. McKay, Bartlesville, Okla., assignor to Phillips Petroleum Company, a corporation of Delaware Application December 24, 1953, Serial No. 400,319

12 Claims. (Cl. 23—270.5)

This invention relates to countercurrent treatment of immiscible fluids. In one aspect it relates to apparatus for use in effecting countercurrent liquid-liquid contacting. In another aspect it relates to apparatus for use in vapor-liquid contacting.

An object of my invention is to provide apparatus for use in effecting efficient contacting of immiscible fluids.

Another object of my invention is to provide a relatively simple and easy to manufacture apparatus for use in contacting immiscible fluids.

Still another object of my invention is to provide a simple and easy to operate and to maintain apparatus for contacting immiscible fluids.

Yet another object of my invention is to provide an inexpensive to manufacture apparatus for use in contacting immiscible fluids, which apparatus provides efficient contacting.

These and other objects and advantages of my invention will be realized upon reading the following description which, taken with the attached drawing, respectively describes and illustrates my invention.

The apparatus of my invention involves tray construction which utilizes alternately arranged perforate plates and nonperforate plates, each pair comprising a perforate plate and a nonperforate plate forming a unit. A specifically heavy liquid phase flows downward through the perforations of the perforate plate to contact the lighter liquid phase which flows along the underside of the tray composed of a plurality of such units. Depending downward from these units are screens or perforate plate baffles through the perforations of which the dispersion of liquids flows. Upon passing one of such baffles separation of contacted products occurs followed by recontacting of the light and heavy phases. A further quantity of the heavy phase from the next perforate plate contacts the once contacted light liquid, and so on across the contacting tray of as many units as desired. After passing the last of the depending baffles the light phase flows upward to the underside of the next higher contacting tray. The same principle is utilized in the apparatus for contacting vapor and liquid phases in which case the liquid flows in a generally downward direction and across the trays containing a number of perforate and nonperforate plates and vertically extending baffles arranged in such fashion that vapor flowing upward through the perforate plates contacts liquid flowing through the baffles and across the tray. The perforations are so arranged that the liquid flowing across the tray and the vapors entering the tray meet in substantially head on contact.

In the drawing Figure 1 represents, in diagrammatic form, an elevational view, partly in section, of one embodiment of apparatus of my invention.

Figure 2 is a cross-sectional view taken on the line 2—2 of Figure 1.

Figure 3 is an elevational view, partly in section, of another embodiment of my apparatus.

Figure 4 is a sectional elevational view, on an enlarged scale, of a liquid-liquid contacting element.

Figure 5 is an elevational view of a portion of the apparatus of Figure 1.

Figure 8:
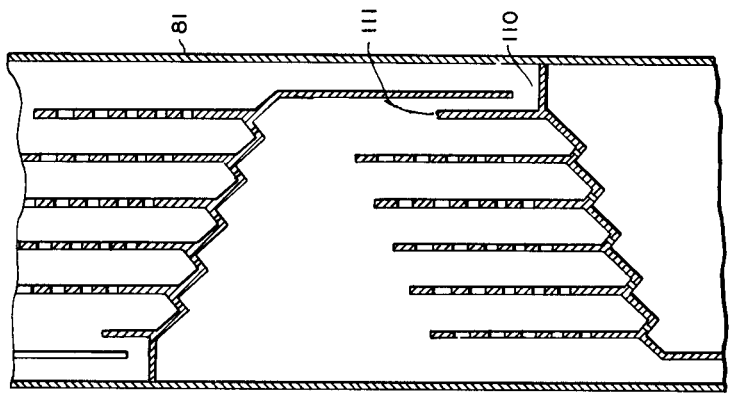
Figure 8 is an elevational sectional view of a portion of yet another embodiment of my apparatus.

Referring now to the drawing and specifically to Figure 1. The apparatus illustrated therein represents a liquid-liquid contacting tower in which is illustrated an embodiment of my contacting apparatus adapted to contact two at least partially immiscible liquid phases of unlike specific gravity and in which the liquid of greatest specific gravity is the continuous phase throughout substantially all of the vessel.

In Figure 1 reference numeral 11 identifies a vertically disposed tower or vessel in which is arranged my contacting trays. The lower contacting tray illustrated in vessel 11 is identified by reference numeral 12. This tray is composed of elongated nonperforate plates 14 arranged in such a manner that their longitudinal axes are mutually parallel and horizontal. Each of these plates 14 slopes upward from right to left and between the upper edge of each of these plates and the lower edge of the next successive plate is disposed a perforate plate 15. Thus it is seen that the relative arrangement of plates 14 and 15 is in a manner similar to the form of saw teeth. At the right hand end of this assembly of plates is a plate 13 which seals the lower edge of the right hand plate 14 with the wall of vessel 11. This assembly of plates can, if desired, be rectangular in shape as may be seen on reference to Figure 2. In Figure 2 plate 13 is seen between the right hand plate 14 and the wall of the vessel 11. On one side of the tray assembly is a plate 91, and on the other side a plate 92 more or less similar to plate 91. These plates 13, 91 and 92 are intended to seal the contacting tray fluid-tight with the wall of the vessel. The space on the side of the vessel 11 opposite plate 13 is open and it is a space through which fluid flows from one tray to another.

In Figure 1 a solvent for use in a solvent extraction operation is introduced into the vessel through a line 18A and is distributed in the vessel by a feed ring 19A. A level of solvent is maintained in the vessel at a height in the vicinity of the feed ring 19A. This level of solvent, however, may be advantageously maintained slightly above this feed ring. With the vessel filled with liquid solvent, which, in this case, is specifically heavier than the liquid to be treated, it is ready for operation. A hydrocarbon liquid to be extracted is introduced through a pipe 27 into a space 25 which may be termed a riser. This riser space is defined by a portion of the circular wall of vessel 11 and a baffle 26. The liquid to be treated rises upward in this riser and flows over the upper end of baffle 26 and under an inverted weir 36. When the vessel is in full operation extraction solvent is continuously introduced into the vessel through the line 18A and a heavy phase is withdrawn through an extract outlet line 27A. This continual introduction and removal of heavy phase provides a continuously downward moving body of solvent and such downflowing solvent flows for example through perforations 33 in the sloping perforate plates 15. The perforate plates 15 are sloped in such a manner that liquid solvent flowing therethrough meets the specifically light hydrocarbon phase substantially headon and in so doing the two liquids are vigorously contacted with each other. Since the solvent is the continuous phase, the hydrocarbon phase is dispersed in the form of small droplets and these droplets move around under the action of the solvent flowing through openings 33. After the initial contacting of solvent and hydrocarbon the solvent tends to flow downward while the hydrocarbon moves from right to left through perforations in a vertically disposed baffle 28. After flowing through baffle 28 the hydrocarbon tends to rise only to be contacted again with heavy solvent coming through perforations 33 in another perforate baffle plate 15 and contacting is again effected. Heavy solvent again tends to flow downward while the hydrocarbon flows from right to left through perforations in baffle 29 to be contacted again in a cyclical manner. Thus, as the hydrocarbon phase works its way from right to left on the underside of tray assembly 12 the hydrocarbon is contacted over and over again with solvent. After the final contacting of solvent and hydrocarbon on the underside of tray 12 the hydrocarbon passes from right to left through the perforations 37 in a final baffle member 32. After passing through the baffle member 32 the hydrocarbon droplets rise upward in a riser space 38 to the underside of the next higher tray. Such a next higher tray may be illustrated in Figure 1 by a tray assembly similar to assembly 39. The hydrocarbon liquid on flowing up riser 38 is admitted to the underside of a contacting tray and flows thereunder from left to right and on flowing in this direction is contacted and recontacted by downflowing solvent as explained above in the explanation of the operation of tray assembly 12. It is obvious that in such an extraction column as many tray assemblies as desired can be utilized. However, a reasonable vertical distance should be provided so that all of the hydrocarbon dispersions are separated from the downflowing solvent from one stage of contacting before the solvent flows through perforations of a next contacting tray. If such were not the case hydrocarbon-solvent dispersions would merely be moved around in the column with the result that extraction would be very poor.

Feed stock to be extracted was hereinbefore stated as being introduced into the column 11 by way of inlet pipe 27. Under some conditions feed stock is introduced by way of an inlet pipe 32A and reflux liquid is then added via the pipe 27.

In the upper portion of vessel 11 a tray assembly 39 is illustrated showing the movement of hydrocarbon from right to left under the tray. To enter the underside of this tray the hydrocarbon flows upward through a riser 23 and downward over an inverted weir 40 onto the underside of the contacting tray. Nonperforate plates 20 and perforate plates 19 are alternately arranged in the same manner as described relative to the tray assembly 12. Depending downward from the angle of juncture of successive plates 19 and 20 are screens or perforate baffles 24. These baffles 24 may be defined as being attached to a line of juncture of successive pairs of plates 19 and 20 in such a manner that the baffles are attached to the apex of an angle formed by the junctures of plates 19 and 20, which angle is greater than the straight angle.

The riser 23 for this upper plate assembly 39 is defined by a portion of the circular wall 11 and a baffle 16. A baffle member 17 defines the riser 22 in conjunction with a portion of the wall of vessel 11 to conduct the liquid of lighter specific gravity from tray assembly 39 to a higher portion of the vessel. A pipe connection 17A is provided at the top of the vessel for outlet of the light liquid phase. The perforations in the upper perforate plates 19 of tray 39 are identified by reference numeral 21. A plate 18 disposed at the left hand end of tray assembly 39 forms a seal between the plate assembly and the wall of the vessel.

It should be observed that each of the perforate plates 19 of tray assembly 39 and perforate plates 15 of tray assembly 12 are arranged to slope at a greater angle from the horizontal than the respectively adjacent nonperforate plates. These perforate plates are arranged at this greater sloping angle so that the heavy liquid phase flowing through the perforations therein does so in a direction more nearly horizontal to give more efficient contacting with the light liquid phase flowing across the underside of the trays.

Figure 4 illustrates on an enlarged scale one method of construction of contacting apparatus of my invention. In this figure, for example, the perforate plate 15 at its highly sloping angle is illustrated as being attached to the upper end of depending baffle member 32. However in this figure the depending baffle member 32 and the baffle 16 extending generally upward therefrom are shown as being formed from a single piece of material. These two members however can be made of separate pieces of material and joined together by welding or riveting or other means of attachment, as desired. I have found, however, that construction is simplified if these two members are made from one piece of material. The perforate plates 15 and the nonperforate plate members 14 are illustrated as being formed from a single piece of material. I have found that this type of construction forms a relatively rigid and strong tray assembly. The portion of the plate members 15 and 14 shown adjacent to perforate baffle 32 may be attached thereto by welding, rivets or bolts as desired. A perforate baffle element 30 shown depending from the lower edge of the right hand nonperforate plate 14 of Figure 4 has an upward extension 34 which is attached to the underside of said plate 14. This element 43 can be attached to plate 14 in any manner as desired. A next adjacent perforate baffle member 31 is illustrated as having an upper element 35 attached to the underside of a next nonperforate plate member 14. The entire tray assembly can if desired be made of as great a number of contacting units being defined as composed of, for example, a sloping perforate plate 15, a sloping nonperforate plate 14, and a depending perforate baffle member 30.

The apparatus illustrated in Figure 3 shows an embodiment of my contacting apparatus of a slightly different arrangement. The several contacting trays illustrated in Figure 1 are constructed as to be generally horizontal. A contacting tray assembly 59 of Figure 3 is disposed in a generally sloping direction and the slope is upward in the direction of flow of the light phase flowing across the tray on its underside. Thus, a column or vessel 51 is provided with a baffle 57 to form a riser space 62 up which flows, for example, a hydrocarbon liquid undergoing extraction. This hydrocarbon liquid flows from the upper end of space 62 under an inverted weir 64 and contacts solvent flowing downward through perforations 61 in a plate 60. Hydrocarbon from this first contacting flows through perforations in depending plate 56 and undergoes a second contacting and the hydrocarbon liquid flows successively through perforate baffles 55, 54, 53 and 52. After flowing through the last of these several perforate baffles, which may also be termed coalescers, the hydrocarbon phase rises upward through a riser 63 to a next higher contacting tray or to the top of the vessel in case tray 59 is the top tray assembly.

In Figure 5 is illustrated a portion of one of the depending perforate baffle members such as perforate baffles 28, 29, 30, 31, 32, 24, of Figure 1 or baffles 52, 53, 54, 55 and 56 of Figure 3. I prefer to make these baffle members in such a manner that perforations near the top are of relatively small diameter and the diameters of the perforations increase progressively down the baffle so that the perforations next to the bottom are of the greatest diameter. In Figure 5 the perforate baffle is identified by reference numeral 70 while perforations of progressively greater diameter are identified by reference numerals 71, 72, and 73.

Figure 6:
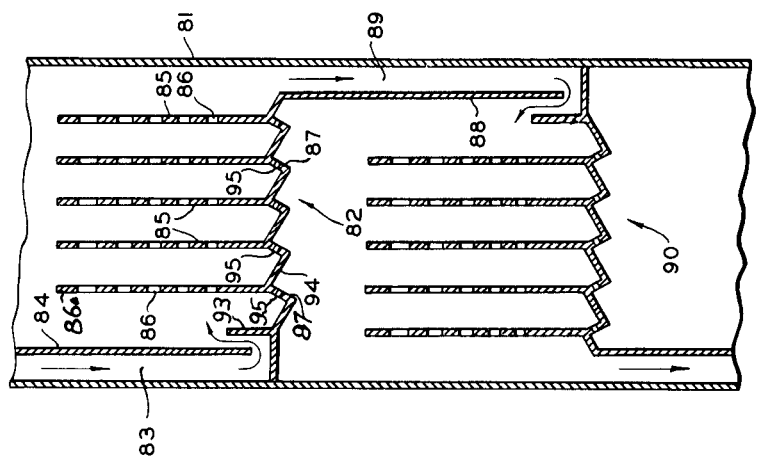
Figure 6 is an elevational view, in section, of a portion of another embodiment of my apparatus.

In Figure 6 is illustrated an embodiment of my invention adapted for use in contacting two liquid phases with the liquid phase of lower specific gravity being the continuous phase in the contacting vessel, that is, the interface between the two phases is held at a level below the lower tray. In Figure 6 a vessel 81 is provided with a contacting tray assembly 82 and a second contacting tray assembly 90. I will explain in detail only the contacting tray assembly 82 since tray assembly 90 is identical therewith excepting it is arranged in such a fashion that liquid flows thereacross in the direction opposite to the flow of liquid across tray 82. Since the liquid of low specific gravity is a continuous phase it fills or substantially fills the vessel and the liquid of high specific gravity will then flow downward in a downspout space 83 which is defined by a portion of the wall of vessel 81 and baffle 84. This relatively heavy liquid flows from the lower end of space 83 over a weir 93 to the first contacting step. On flowing over weir 93 the heavy liquid flows in a generally downward direction and contacts the light liquid flowing in generally upward and through perforations 95 in a perforate plate 87. At this stage of contacting the contacting operation between the light phase and the heavy phase are substantially the same as the contacting explained relative to Figure 1 with the exception that heavy phase is dispersed as small droplets. Light liquid on flowing upward through openings 87 tend to carry the heavy liquid upward along baffle 86a and this baffle serves as a coalescer of the dispersed heavy liquid. The heavy liquid tends to flow from left to right through perforations 86 in the several upward depending perforate baffles 86a and 85 and over their upper edges. Thus on going from contacting step to contacting step across tray 82 the heavy liquid is contacted with quantities of light phase and the heavy liquid droplets finally pass through perforations 86 in a final baffle and over the upper edge of the final baffle and in a downcomer 89 to be conducted to a next lower contacting stage. This downcomer 89 is defined by a portion of the walls of vessel 81 and the baffle plate 88. The heavy liquid then flows across the contacting tray 90 in a direction from right to left and is contacted thereon by light liquid flowing upward through the perforations in perforate plates similarly arranged to those in tray 82.

Figure 7:
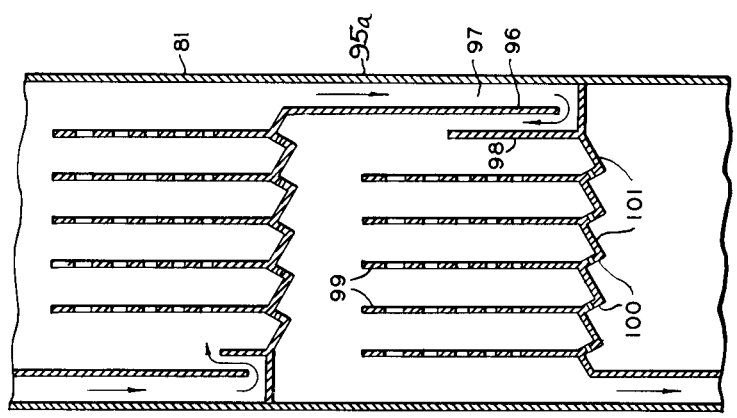
Figure 7 is an elevational sectional view of a portion of still another embodiment of my apparatus.

The embodiment of apparatus illustrated in Figure 6 can be modified and used for contacting a liquid phase with a vapor phase. Such an embodiment of apparatus is illustrated in Figure 7. In this figure perforate plates 100 and nonperforate plates 101 are similar respectively to the perforate and nonperforate plates 14 and 15 of Figure 1. Liquid from a tray higher up in the column flows downward through a downcomer space 97 which is defined by a baffle 96 and a portion of the walls of vessel 95a. Liquid then flows upward through a space defined by baffle 96 and a weir 98. Liquid then flows over weir 98 and downward between weir 98 and the first perforate baffle 99 to be contacted by gas flowing upward through the first perforate plate 100. Liquid then flows through perforations in successive perforate baffles 99 across the plate from right to left. Thus, the main difference between the embodiment of Figure 7 and that of Figure 6 is the provision of a relatively high weir 98. The baffle 98 in the case of contacting apparatus for liquid-vapor contacting is higher than when contacting only immiscible liquids because vapors and liquids usually differ more in density than do liquids ordinarily being contacted.

In Figure 8 an embodiment of vapor-liquid contacting apparatus is illustrated in which the contacting trays are arranged sloping in a manner in general similar to tray 59 of Figure 3. In Figure 8 since this apparatus is for vapor-liquid contacting a liquid trap 110 is provided with a tall weir 111 similar to weir 98 of Figure 7.

As an illustration of the operation of the contacting apparatus of my invention the following example is given. The apparatus used in making the following reported runs was small scale apparatus and the contacting trays were rectangular in shape and were 2¼ inches wide by 7 inches long. Two contacting tray assemblies of said dimensions were installed in a glass column of rectangular cross-section and were disposed 6½ inches apart. Each of these contacting trays was provided with four individual contacting units. Each unit had depending coalescing screens. The solvent was methyl carbitol containing 5 per cent water by weight. Temperature of contacting was 100° F. The capacity of this column using n-heptane as a light phase with the methyl carbitol and water as a solvent was about 940 gallons per hour per square foot of combined stream at a 20 to 1 solvent to hydrocarbon ratio. At a solvent to hydrocarbon ratio of 10 to 1 the capacity of the column was about 990 gallons combined stream per square foot per hour.

In the following example is given results of two runs using as solvent methyl carbitol containing 5 per cent by weight of water and a hydrocarbon feed containing 76 per cent cyclohexane and 24 per cent n-heptane. The contacting operations were carried out at 100° F. and at a solvent to hydrocarbon ratio of 14.5 pounds of solvent per pound of hydrocarbon.

| Solvent Feed | | Extract | | Raffinate | Hydrocarbon Feed |
|---|---|---|---|---|---|
| #Sol./ #HC | Hydrocarbon Solvent Free Wt. Percent Cyclohexane | #Sol./ #HC | Hydrocarbon Solvent Free Wt. Percent Cyclohexane | Solvent Free Wt. Percent Cyclohexane | Solvent free Wt. Percent Cyclohexane |
| 20.7 | 37.0 | 14 | 66.5 | 56.5 | 76.0 |
| 20.7 | 37.0 | 17.6 | 67.0 | 55.0 | 76.0 |

Tray efficiency=39.3 percent and 44.7 percent, or 42 percent average. HETS=1.29 feet.

It will be observed that the efficiency per tray in this 2-tray column averaged 42 per cent which is reasonably high for tray efficiency. It is realized that larger columns having more contacting steps per tray will of course yield higher efficiencies. But with such a column with four contacting steps per tray it is also realized that a 42 per cent tray efficiency represents very effective contacting operations.

Materials of construction for building apparatus herein disclosed may, in general, be selected from among materials generally available in commerce taking into consideration corrosive nature of any materials undergoing treatment. It is further realized that such apparatus parts may be constructed of several individual pieces of materials fastened to each other by riveting or welding or other means or one piece of material may be utilized by bending to form the saw tooth contacting tray apparatus as hereinbefore described.

While certain embodiments of the invention have been described for illustrative purposes the invention obviously is not limited thereto.

I claim:

1. In a vertically disposed column for contacting two immiscible liquids of unlike specific gravities, a liquid-liquid contacting tray assembly comprising, in combination, a tray of generally saw-tooth cross-section, said tray comprising a plurality of elongated plates having their longitudinal axes mutually parallel and horizontal and successive plates being joined along the elongated sides in such a manner that the transverse axis of every other plate slopes upward from the horizontal and the transverse axis of the alternate plates slopes downward from the horizontal, the upward sloping plates being perforated and sloping at a greater angle from the horizontal than the alternate and downward sloping plates, said downward sloping plates being nonperforate, means for introducing one liquid to one side of said tray at the edge thereof adjacent a less sloping plate in such a manner that the direction of flow of said one liquid across the tray is perpendicular to the longitudinal axes of said plates, each successive pair of said sloping plates beginning with the first plate sloping at said greater angle nearest said edge forming an outside angle greater than a straight angle on said one side of said tray, a separate perforate baffle plate being parallel to the vertical axis of the tray assembly and being attached to said plates along the line of juncture forming said angle greater than a straight angle on said one side of said tray, means for introducing the other liquid to the other side of said tray, and separate means for removing liquids from said tray.

2. The contacting device of claim 1, wherein said one liquid is the specifically light liquid and the means for introducing said one liquid to said one side of said tray is means for adding said one liquid to the underside of said tray.

3. The contacting device of claim 1, wherein said one liquid is the specifically heavy liquid and the means for introducing said one liquid to said one side of said tray is means for adding said one liquid to the upper side of said tray.

4. The contacting device of claim 2 wherein the sloping plates are so arranged that the specifically light liquid flows across the underside of said tray in a generally horizontal direction.

5. The contacting device of claim 2 wherein the sloping plates are so arranged that the specifically light liquid flows across the underside of said tray in a generally upwardly sloping direction.

6. The contacting device of claim 3 wherein the sloping plates are so arranged that the specifically heavy liquid flows across the upper side of said tray in a generally horizontal direction.

7. The contacting device of claim 3 wherein the sloping plates are so arranged that the specifically heavy liquid flows across the upper side of said tray in a generally downwardly sloping direction.

8. The contacting device of claim 2 wherein a liquid feed trap is disposed on the underside of said tray on the edge thereof adjacent a nonperforate elongated plate, means to deliver one liquid to a lower level and means to deliver the other liquid to a higher level in said column.

9. The contacting device of claim 3 wherein a liquid feed trap is disposed on the upper side of said tray on the edge adjacent a nonperforate elongated plate, means to deliver one liquid to a lower level and means to deliver the other liquid to a higher level in said column.

10. In a vessel for contacting two immiscible fluid phases of unlike specific gravities, a fluid-liquid contacting tray assembly comprising, in combination, a tray of generally saw-tooth cross section, said tray comprising a plurality of elongated plates having their longitudinal axes mutually parallel and horizontal and successive plates being joined along their elongated sides in such a manner that the transverse axis of every other plate slopes upward from the horizontal and the transverse axis of the alternate plates slopes downward from the horizontal, the upward sloping plates being perforated and sloping at a greater angle from the horizontal than the downward sloping plates, said downward sloping plates being nonperforate, means for introducing liquid to the upper side of said tray at the edge thereof adjacent a less sloping plate, each successive pair of said sloping plates beginning with the first plate sloping at said greater angle nearest said edge forming an angle greater than a straight angle on said upper side of said tray, a separate perforate baffle plate being parallel to and extending upward from the line of juncture of each successive pair of sloping plates forming said angle greater than a straight angle on said upper side of said tray, means for introducing said fluid to the other side of said tray, and separate means for removing fluids from said tray.

11. The contacting device of claim 10 wherein the sloping plates are so arranged that the specifically heavy fluid flows across the upper side of said tray in a generally horizontal direction.

12. The contacting device of claim 10 wherein the sloping plates are so arranged that the specifically heavy fluid flows across the upper side of said tray in a generally downward direction.

References Cited in the file of this patent

UNITED STATES PATENTS 2,678,201   Koch _____ May 11, 1954